2,766,253

THIAZOLYL MERCAPTO ALKYL THIONOCARBAMATES

Paul M. Downey, Gainesville, Fla., and Thomas E. Lesslie, St. Albans, W. Va., assignors to Monsanto Chemical Company, St. Louis, Mo., a corporation of Delaware No Drawing. Application February 26, 1954, Serial No. 412,933

5 Claims. (Cl. 260—306)

The present invention relates to a new class of thionocarbamates and to methods for their preparation.

The compounds of the present invention may be represented by the structure

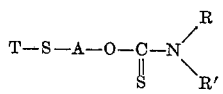

where T represents a thiazolyl radical, as for example benzothiazolyl, thiazolyl, dimethyl thiazolyl, ethyl thiazolyl, 5-carbethoxy-4-methyl thiazolyl, 5-carbomethoxy-4-methyl thiazolyl, 4-methyl-5-acetyl thiazolyl, 5-chlorobenzothiazolyl and dihydrothiazolyl, A represents an alkylene group, as for example ethylene, propylene and hexamethylene, but is preferably an ethylene group and R and R' represent hydrogen, alkyl or substituted alkyl groups. Other examples are methyl, ethyl, propyl, butyl, amyl and hexyl groups. Substituted alkyl groups include aralkyl groups, examples of which are benzyl, alpha-methyl benzyl and beta-phenethyl groups. Further examples are tetrahydrofurfuryl and alkyl radicals substituted by halogen, hydroxy, alkoxy, cyano or mercapto groups of which the following are typical:

$ClC_2H_4-$, $NO_2C_2H_4-$, $HOC_2H_4-$, $HOCH_2CH_2CH_2-$, $C_4H_9OC_2H_4-$, $CH_3OC_2H_4-$, $C_2H_4SC_2H_4-$, $CNC_2H_4-$, $CH_2=C(Cl)CH_2$ and

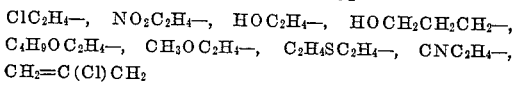

groups.

The new compounds are formed conveniently by condensing the corresponding xanthate with chloroacetic acid and treating the condensation product with ammonia or an amine. It has been found that the hydroxy alkyl mercaptothiazoles readily form xanthates. This is noteworthy especially in the case of hydroxy ethyl mercaptothiazoles which undergo rearrangement quite readily. The following is a description of a typical preparation of a xanthate:

A solution was prepared consisting of 100 grams (0.474 mole) of 2-(2-benzothiazolylmercapto)ethanol in 400 grams of carbon bisulfide. The temperature of the solution was kept below 35° C. while 28.5 grams (0.431 mole) of finely powdered KOH was added in small portions. The mixture was stirred for one hour, the sides of the flask rinsed with a little carbon bisulfide and set aside overnight. The crystals which had separated were removed by filtration, washed with a little ether and air dried. The yield of potassium 2-(2-benzothiazolylmercapto)ethyl xanthate was 137 grams or 97.8% of the theoretical.

Condensation of the xanthates with sodium chloroacetate produces an intermediate of the type

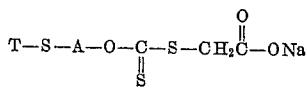

where T and A have the same significance as before and the desired thionocarbamate is obtained by reaction with an amine or ammonia. From alkylene diamines such as ethylene diamine, propylene diamine and hexamethylene diamine bis compounds of the general type

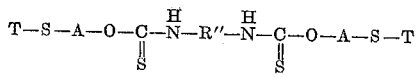

are obtained, where R" represents an alkylene group. Details of typical preparations of the new compounds follow:

Example 1

30 grams or 0.212 mole of chloroacetic acid was dissolved in enough 20% sodium carbonate solution to form a solution having a pH of about 8. The solution of sodium chloroacetate so prepared was poured over 67 grams (0.206 mole) of potassium 2-(2-benzothiazolylmercapto)ethyl xanthate and 100 ml. of water added to make a clear solution. After about 30 minutes 15 grams (0.25 mole) of 98% isopropylamine was added and the solution cooled to 16° C. The temperature rose rapidly to 26° C. and after a few minutes a precipitate appeared. The reaction mixture was stirred for about 2 hours. The reaction mixture then consisted of two layers. The organic layer was dissolved in benzene, the benzene solution washed with water and the solvent removed by distillation to yield 56 grams of a yellow oil. This represents a yield of 87.5% of the theoretical. The 2-(2-benzothiazolylmercapto)ethyl N-isopropyl thionocarbamate was very soluble in organic solvents, as for example benzene, acetone, ethyl alcohol, methanol, ethyl acetate, chloroform and ether but insoluble in water and only slightly soluble in hot heptane.

Example 2

In the manner described in the foregoing example 19.4 grams (0.2 mole) of chloroacetic acid was neutralized with about 5.45 grams of 20% sodium carbonate solution and condensed with 65.3 grams (0.2 mole) of potassium 2-(2-benzothiazolylmercapto)ethyl xanthate. Ammonia was bubbled through the reaction mixture for about 4 hours and the mixture set aside to cool in an ice chest. The product was removed by filtration, washed with water and dried at 50° C. to yield 53 grams (98% of the theoretical) of 2-(2-benzothiazolylmercapto)ethyl thionocarbamate, a buff colored powder which melted with decomposition at 184° C. The compound was slightly soluble in hot water, acetone, chloroform, and hot heptane.

Other examples of the new compounds comprise di[2 - (2 -benzothiazolylmercapto)ethyl]N,N'-ethylene bis thionocarbamate 3-(2-benzothiazolylmercapto)propyl thionocarbamate 2-(2-benzothiazolylmercapto)ethyl N-2-hydroxyethyl thionocarbamate 2-(2-benzothiazolylmercapto)ethyl N-methyl thionocarbamate 2-(2-benzothiazolylmercapto)ethyl N-2-chlorallyl thionocarbamate.

The new compounds are efficient defoliants. For instance, application of 2-(2-benzothiazolylmercapto)ethyl isopropyl thionocarbamate to cotton as a 2% spray at the rate of 18 pounds per acre resulted in a high degree of defoliation. Similarly, 2-(2-benzothiazolylmercapto)-ethyl thionocarbamate is a very efficient defoliant for beans applied as a spray containing 1% or less of the active ingredient.

It is intended to cover all changes and modifications of the examples of the invention herein chosen for purposes of disclosure which do not constitute departures from the spirit and scope of the invention.

What is claimed is:
1. New compounds of the structure

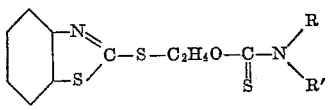

where R and R' are selected from a group consisting of hydrogen and alkyl radicals containing less than 8 carbon atoms.

2. New compounds of the structure

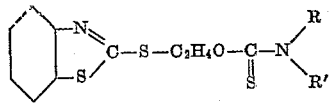

where R and R' represent alkyl radicals containing less than 7 carbon atoms.

3. A new compound of the structure

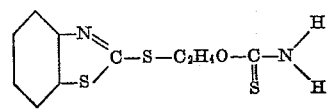

4. A new compound of the structure

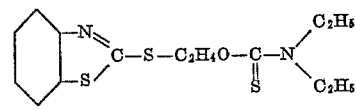

5. A new compound of the structure

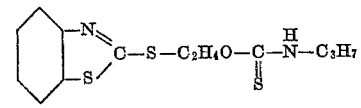

References Cited in the file of this patent

UNITED STATES PATENTS 2,092,712    Clifford  --------------- Sept. 7, 1937
2,211,616    Clifford  --------------- Aug. 13, 1940

OTHER REFERENCES

Holmberg et al.: Chem. Abst., vol. 19, pp. 56–7 (1925).
Nador: Chem. Abst., vol. 46, p. 7547 (1952).
Davies et al.: Chem. Abst., vol. 41, cols. 405–6 (1947).